UNITED STATES PATENT OFFICE.

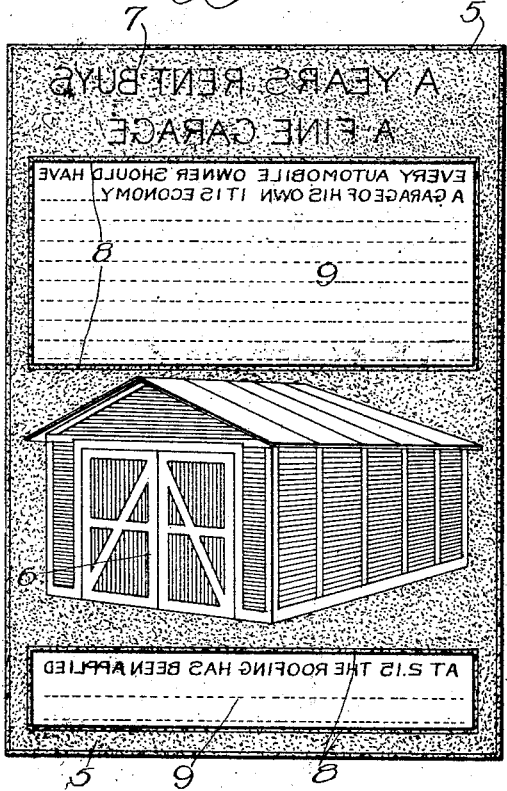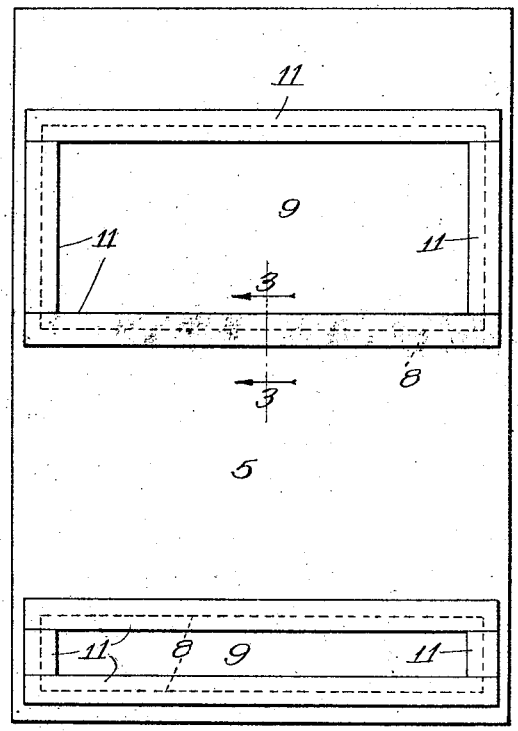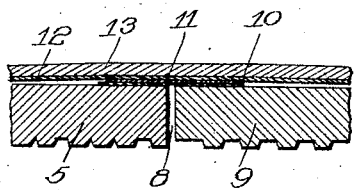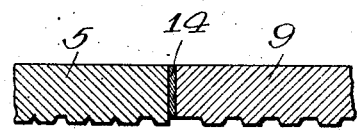

JOHN J. COOK, OF CHICAGO, ILLINOIS.

METHOD OF SECURING AN ELECTROTYPE-INSERT IN AN ETCHED PLATE.

1,148,148.

Specification of Letters Patent.

Patented July 27, 1915.

Application filed September 5, 1914. Serial No. 860,329.

*To all whom it may concern:*

Be it known that I, JOHN J. COOK, a citizen of the United States, residing at Chicago, in the county of Cook and State of Illinois, have invented certain new and useful Improvements in Methods of Securing an Electrotype-Insert in an Etched Plate, of which the following is a specification.

This invention relates to an improved method of soldering an electrotype insert or patch in an etched plate for printing purposes.

In the production of plates for the printing of illustrated catalogues, circulars, and similar advertising matter, it is a common practice to make a zinc or copper plate etching containing the cuts to illustrate the subject matter of the advertisement, and to form in such plate beneath or otherwise adjacent to the etched cuts, openings, in which are inserted electrotype plates containing the printed matter descriptive of the cuts. These electrotype inserts or patches have heretofore been secured within the openings of the zinc or copper plate etching by an ordinary soldering operation, the filled etching being laid face downward on a suitable flat surface, and the solder being applied to the joints on the back side of the plate by running a stick of solder and a soldering iron over the same in the usual method of soldering. Where an etching contains a considerable number of such inserts or patches, this soldering operation is a quite laborious and tedious one, requiring considerable time and pains on the part of the operator to do a good job.

The object of my present invention is to simplify and facilitate the operation of securing these inserts or patches in the openings of the etched plate; and this object I accomplish by the new and improved method of soldering forming the subject matter of this invention and hereinafter described in detail.

In order that my invention may be clearly understood I have illustrated in the accompanying drawing a printing plate of the character referred to, the several views illustrating various stages of the latter at different points of the process of manufacture.

Referring to the drawing, Figure 1 is a top plan or face view of an etched plate, showing two electrotype inserts or patches set therein; Fig. 2 is a bottom plan or back view of the same and showing the joints between the plate and the electrotype inserts overlaid by thin strips of soldering material, such as tin foil, preliminary to the final operations by which this soldering material is melted and caused to flow into said joints; Fig. 3 is an enlarged cross sectional detail on the line 3—3 of Fig. 2, and Fig. 4 is an enlarged cross sectional detail through a soldered and finished joint.

In carrying out my invention, I take a zinc or copper plate 5 on which has been etched certain subject matter of a pictorial or descriptive character, such as is shown at 6 and 7, and at suitable points thereon I saw or otherwise cut out portions of this plate thereby forming openings therethrough, the margin lines of which are indicated at 8. The etched plate 5 thus prepared is laid face downward on a suitable support, and into the openings are loosely fitted the electrotype inserts or patches 9, these latter usually containing electrotypes descriptive of the etchings. I then preferably coat the joint between meeting edges of the plate 5 and electrotypes 9 with any suitable soldering flux such as muriate of zinc, this latter being indicated at 10 in Fig. 3. I then completely cover said joint with thin flexible strips 11 of soldering material,—ordinary tin foil serving well for this purpose. The rear surface of the plate thus treated, is then preferably overlaid by a thin sheet of paper indicated at 12 in Fig. 3, on which latter is then placed a relatively stiff sheet 13 of cardboard, strawboard, or the like which serves to support the assembled parts while being transferred onto a heated surface, on which the assembly is laid cardboard side down. The heated surface referred to is maintained at a temperature that suffices, after an application of approximately one minute, to completely melt the tin foil soldering material by heat transmitted through the supporting sheet or sheets 12 and 13. After the soldering material is melted, the assembly is transferred to a cold surface, and is preferably placed beneath a press which forces the melted solder throughly and uniformly into the joints, filling the latter, as indicated at 14 in Fig. 4, and securely uniting the electrotype plates to the zinc or copper plate etching, with their printing surfaces in the plane of the etched matter on the plate 5. The supporting plate 13 is then removed, and with a metal scraper the adhering portions of the paper sheet 12 and the surplus solder are quickly removed, and the completed article is ready for the printing press.

By my improved method of soldering the patched etching can be produced in a small fraction of the time heretofore required to produce the same in the known and common method and with much less labor and skill on the part of the operator. Furthermore, my improved method produces a stronger and more uniform and perfect joint than can be produced by the old method.

It will be manifest to those skilled in this art that the described method may be modified in minor details without departing from the substance of the invention or sacrificing any of the advantages thereof. For instance, the soldering flux may be coated on the tin foil before the latter is applied to the joints, if desired.

The heating and pressing operations may be conveniently performed on an ordinary sweating-on machine, the assembled structure being laid on the hot plate or hearth of the machine for melting the solder, and being then slid edgewise into the press of the machine for the final compressing operation. Where the article is produced in this way the use of the thin paper sheet 12 is not essential, but is preferable because much easier to scrape from the back of the finished article than the heavier strawboard or cardboard sheet 13 which supports the parts in assembled position during transfer to the heating and pressing apparatus.

I claim:

1. A method of securing an electrotype insert in an etched plate which consists in cutting an opening through the latter of substantially the form and size of the electrotype, setting the latter in said opening, covering the joint between meeting edges of the plate and inserted electrotype on the rear sides of said electrotype and plate with a thin flexible soldering material such as tin foil, and then applying sufficient heat to said soldering material to cause it to melt and flow into said joint.

2. A method of securing an electrotype insert in an etched plate which consists in cutting an opening through the latter of substantially the form and size of the electrotype, setting the latter in said opening, coating the joint between meeting edges of the etched plate and inserted electrotype on the rear sides of said electrotype and plate with a soldering flux, covering said joint with thin flexible strips of soldering material such as tin foil, and then applying sufficient heat to said soldering material to cause it to melt and flow into the said joint.

3. A method of securing an electrotype insert in an etched plate which consists in cutting an opening through the latter of substantially the form and size of the electrotype, setting the latter in said opening, coating the joint between meeting edges of the plate and inserted electrotype on the rear sides of said electrotype and plate with a soldering flux, covering said joint with thin flexible strips of soldering material such as tin foil, covering the rear side of the plate thus prepared with a supporting sheet, depositing the assembled structure rear side down on a flat surface, and then applying heat and pressure sufficient to melt said soldering material and force it into the joint between the plate and the electrotype.

4. A method of securing an electrotype insert in an etched plate which consists in cutting an opening through the latter of substantially the form and size of the electrotype, setting the latter in said opening, coating the joint between meeting edges of the plate and inserted electrotype on the rear sides of said electrotype and plate with a soldering flux, covering said joint with thin strips of a soldering material such as tin foil, covering the rear side of the plate thus prepared with a supporting sheet, depositing the assembled structure rear side down on a heated plate and allowing it to remain thereon a sufficient length of time to melt said soldering material, and finally applying pressure to force the melted soldering material into the joint between the plate and the electrotype.

JOHN J. COOK.

Witnesses:
S. N. POND,
A. G. LATIMER.